US006176958B1

(12) United States Patent
Shea

(10) Patent No.: US 6,176,958 B1
(45) Date of Patent: Jan. 23, 2001

(54) PERFORATED DISPLAY PANEL AND METHOD OF MANUFACTURING SAME

(76) Inventor: Brian J. Shea, 144 N. Murray Ave., Ridgewood, NJ (US) 07450

( * ) Notice: Under 35 U.S.C. 154(b), the term of this patent shall be extended for 0 days.

(21) Appl. No.: 09/193,706

(22) Filed: Nov. 17, 1998

(51) Int. Cl.[7] ........ B32B 31/00

(52) U.S. Cl. ........ 156/253; 156/277; 40/594; 40/615; 428/137

(58) Field of Search ........ 156/253, 277; 40/594, 615; 428/137

(56) References Cited

U.S. PATENT DOCUMENTS

| | | | |
|---|---|---|---|
| 3,953,625 | 4/1976 | Quaintance et al. | 427/258 |
| 3,961,434 | 6/1976 | Sampon | 40/437 |
| 4,102,101 | 7/1978 | Nielsen et al. | 52/263 |
| 4,167,839 | 9/1979 | Nielsen et al. | 52/105 |
| 4,321,778 | 3/1982 | Whitehead | 52/204.591 |
| 4,447,995 | 5/1984 | Fulcher | 52/38 |
| 4,673,609 | 6/1987 | Hill | 428/187 |
| 4,925,705 | 5/1990 | Hill | 427/259 |
| 5,383,996 | 1/1995 | Dressler | 156/234 |
| 5,521,655 | 5/1996 | Rhoad | 351/51 |
| 5,525,177 | 6/1996 | Ross | 156/240 |
| 5,609,938 | 3/1997 | Shields | 428/138 |
| 5,679,435 * | 10/1997 | Andriash | 428/137 |
| B1 4,673,609 | 7/1995 | Hill | 428/187 |

* cited by examiner

*Primary Examiner*—Linda L. Gray

(57) ABSTRACT

A method of manufacturing high-quality perforated display panels that is both simple and inexpensive to implement is disclosed. In a preferred embodiment, the method of manufacture includes the steps of: printing a design on one side of a single sheet of material; floodcoating the second side of the sheet with a solid layer of black ink; applying an adhesive layer to one of the two sides of the sheet, and in particular, on the black side of the sheet when the panel is to be exterior mounted and on the design side of the sheet when the panel is to be interior mounted; applying a release liner to cover the adhesive; and perforating in tandem the sheet of material, the adhesive, and the release liner. An improved perforated display panel preferably includes: a single sheet of material having a design printed on one side thereof and a solid black layer printed on a second side thereof; an adhesive layer; and a release liner covering the adhesive layer.

9 Claims, 5 Drawing Sheets

PERFORATED DISPLAY PANEL AND METHOD OF MANUFACTURING SAME

BACKGROUND OF THE INVENTION

Advertising of products and services is a world-wide, multi-billion-dollar industry. Indeed, because sales of many goods depend substantially on brand name recognition with customers, modern consumers are regularly exposed to a wide variety of images and sounds all intended to communicate to them the names or qualities of a particular merchant's products.

Point of purchase ("P.O.P.") panels or posters are one important vehicle for communicating advertising and marketing information to consumers. Such panels are often attached to a storefront window and may be designed, for example, to educate customers about the merchant's products or to encourage potential customers passing by a retail location to enter the premises. Advertising posters may also be mounted in non-point-of-purchase locations such as on buses, billboards, or as broadsides.

In the past, P.O.P. panels have typically been printed on an opaque substrate and affixed to storefront windows by either pressure sensitive adhesive or static cling. Opaque panels, however, suffer from several significant drawbacks. First, when hung in a shop window, such panels block much of the sunlight that would otherwise enter the store. Moreover, in certain retail environments, such as fast-food restaurants, it is desirable that customers be able to look outside while, for example, eating at a table near the window.

To overcome these drawbacks, it has been proposed to print P.O.P. panels on a perforated layer of a multi-layer material. When viewed from one side, the resulting panel presents the printed design. When viewed from the other side, however, the perforated panel is substantially see-through, and the printed design is substantially not visible. Persons facing this second side of the panel (e.g., persons looking out the front window of a restaurant) are thus able to see through the panel, but cannot see the printed design.

But these prior art multi-layer panels also suffer from severe drawbacks. First, the multi-layer panels of the prior art are expensive and difficult to make. For example, one commercial embodiment of prior art multi-layer stock comprises at least four layers: a perforated 8 mm white/black vinyl laminate, a pressure-sensitive adhesive on one side of the laminate, a perforated 90# staflat release liner covering the adhesive, and an unperforated thin plastic membrane attached to the release liner.

The unperforated membrane is necessary because commercial printers employ suction to grip and move the workpiece from one printing station to the next. Suction, however, cannot be employed to grip and move perforated sheets. An unperforated membrane is therefore necessary to permit suction to grip the multi-layer material.

Manufacture of multi-layer materials like the one described above is both time consuming and expensive. Consequently, the cost of these materials is significantly higher than that of ordinary banner material. Moreover, because significant spoilage must be expected during printing, many multi-layer sheets do not yield usable panels and must be thrown away. Therefore, the cost of producing large quantities of display panels using such prior art multi-layer materials is often prohibitively expensive and offers little or no economies of scale.

Another drawback of prior art multi-layer panels is that interior and exterior panels cannot be printed on the same multi-layer stock. In particular, the multi-layer stock described above is not suitable as an interior-mounted panel because it is not possible to print a design on the side of the laminate that is coated with adhesive. Consequently, interior panels are typically made from a different multi-layer material than the one described above. For example, one commercially available material for printing interior panels comprises a 6 mm perforated clear vinyl layer, a layer of adhesive, and a perforated release liner. The perforated release liner is covered by an additional non-perforated membrane to permit suction to grip the sheet during printing and processing. With this panel, the desired design is printed in reverse on the side of the laminate that is not coated with adhesive. The printed design is then covered by a layer of white ink to set up the image and then black backed. Because the panel and adhesive are clear, the image can be seen through the panel when the panel is displayed in, for example, a store window.

Thus, another disadvantage of the prior art is that it requires different stock for interior and exterior panels. Consequently, a decision must be made prior to printing as to whether the panel to be printed will be mounted on an exterior or interior surface.

It has also been proposed to manufacture P.O.P. panels having the bi-directional properties described above by printing a silhouette pattern, rather than a complete design, on the panel. Because the silhouette pattern comprises both opaque and transparent areas, the design embodied in the silhouette pattern can be seen by persons on one side of the panel, while the panel appears substantially see-through to persons standing on the other side of the panel. This prior art technique, however, also suffers from a serious drawback in that the design must be printed as a silhouette pattern, a difficult and expensive process.

There is therefore a need in the art for high quality display panels that are simple and inexpensive to produce, but that exhibit the bi-directional qualities described above.

SUMMARY OF THE INVENTION

The present invention is directed to a method of manufacturing high quality perforated display panels that is both simple and inexpensive to implement.

In a preferred embodiment, the method of manufacture of the present invention comprises the steps of:

- printing a design on one side of a single sheet of material;
- floodcoating the second side of the sheet with a solid layer of black ink;
- applying an adhesive layer to one of the two sides of the sheet, and in particular, on the black side of the sheet when the panel is to be exterior mounted and on the design side of the sheet when the panel is to be interior mounted;
- applying a release liner to cover the adhesive; and
- perforating in tandem the sheet of material, the adhesive, and the release liner.

In another aspect, the present invention is directed to an improved perforated display panel that comprises:

- a single sheet of material having a design printed on one side thereof and a solid black layer printed on a second side thereof;
- an adhesive layer; and
- a release liner covering the adhesive layer.

BRIEF DESCRIPTION OF THE DRAWINGS

The above summary of the invention will be better understood when taken in conjunction with the following detailed description and accompanying drawings in which.

DETAILED DESCRIPTION OF THE PREFERRED EMBODIMENTS

Figure 1:
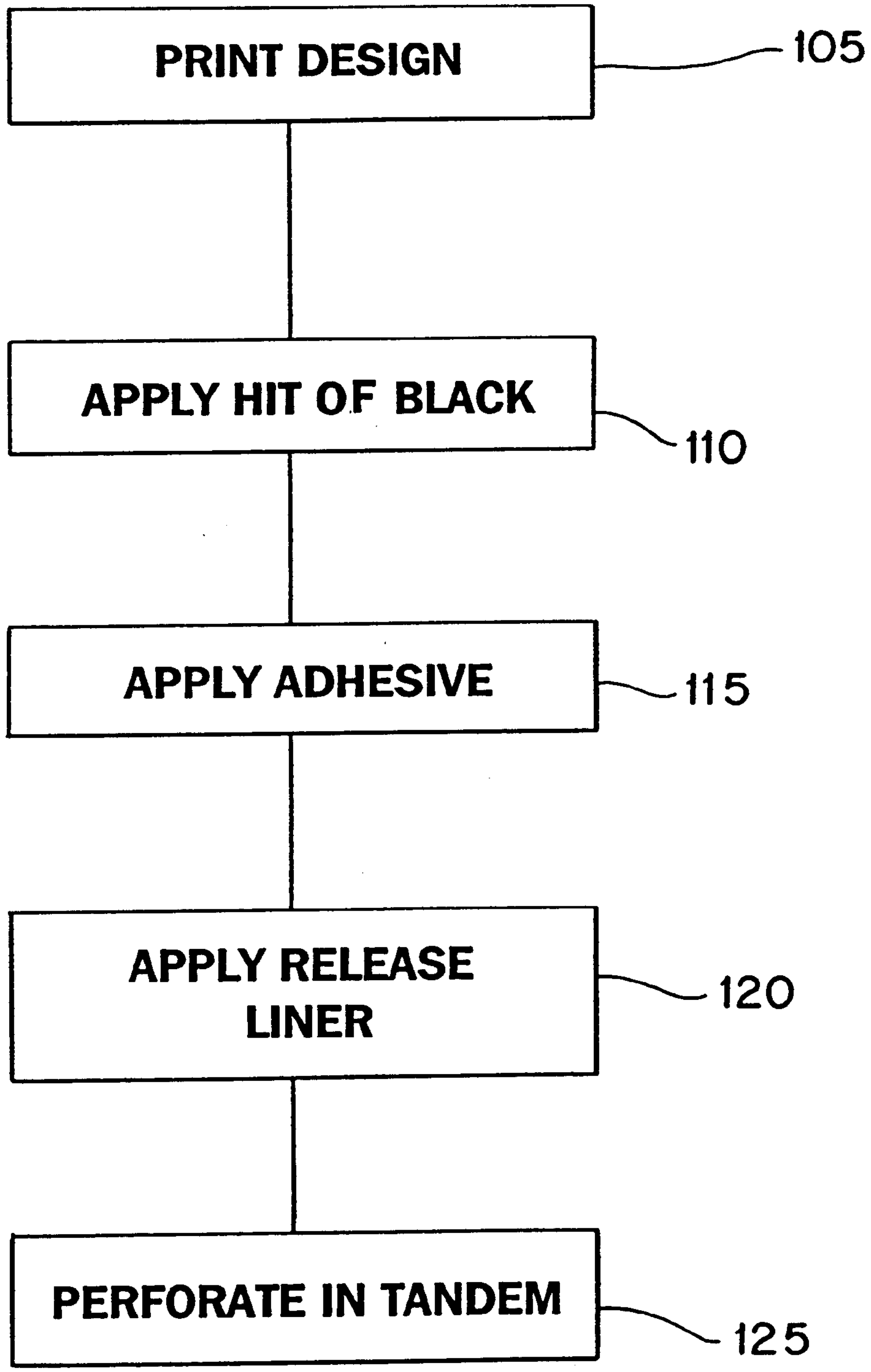
FIG. 1 is a flowchart depicting the process steps in the manufacture of display panels of the present invention.

The flowchart in FIG. 1 depicts a preferred embodiment of the process for manufacturing the improved display panels of the present invention. The steps depicted in FIG. 1 will be described in connection with FIGS. 2–9, which illustrate the state of a workpiece at various points during the manufacturing process.

Turning to FIG. 1, in step 105, a design or other message is printed on the workpiece. In a preferred embodiment, the workpiece is a single sheet of a medium density polyethylene blockout film having high opacity, and preferably 100% opacity. To facilitate printing, the polyethylene is preferably corona treated to provide an average surface tension of approximately 52 dynes.

One preferred polyethylene film suitable for use as a workpiece in the present invention is PLASTIBANNER™ blockout banner film available from Plastiprint, Inc. of Lakewood, Colo. A cross-sectional view of this material is shown in FIG. 2.

Figure 2:
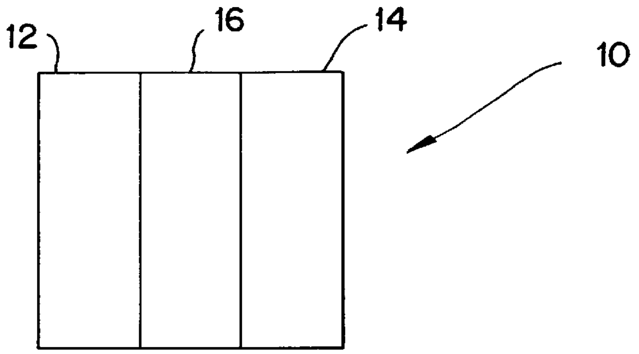
FIG. 2 is a schematic representation of a cross-sectional view of a preferred polyethylene laminate for use as a workpiece in the present invention.

As shown in FIG. 2, preferred polyethylene material 10 has a thickness of 8 mm, and is composed of three coextruded layers. Outside layers 12, 14 are white layers, while inside layer 16 is a grey layer. Grey layer 16 contributes greatly to the opacity of the material and, as described below, makes it especially suitable as a workpiece for the present invention.

Another suitable material suitable for use as a workpiece in the present invention is TRANS BANNER II™ coextruded two-sided treated, white/gray/white poyethylene material manufactured by Transilwrap Co. of Chicago, Ill.

In a preferred embodiment, the printing is performed using an offset or lithographic printing process. Illustrative examples of designs printed on a workpiece are shown in FIGS. 3A–B.

Figure 3A:
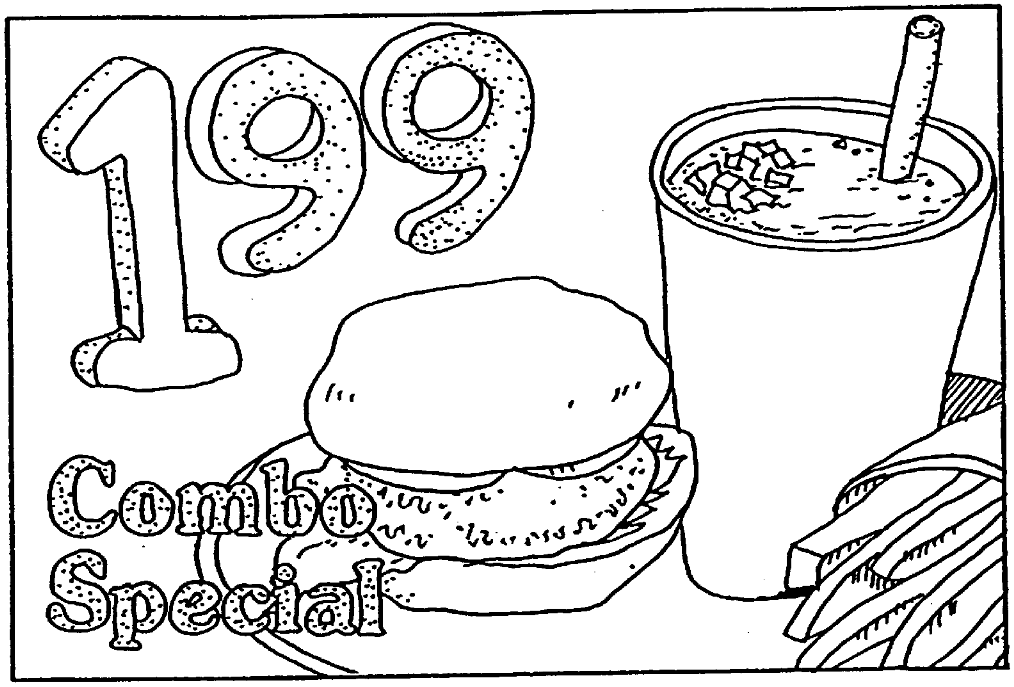
FIG. 3A is a plan view of a workpiece after a design has been printed thereon.
Figure 3B:
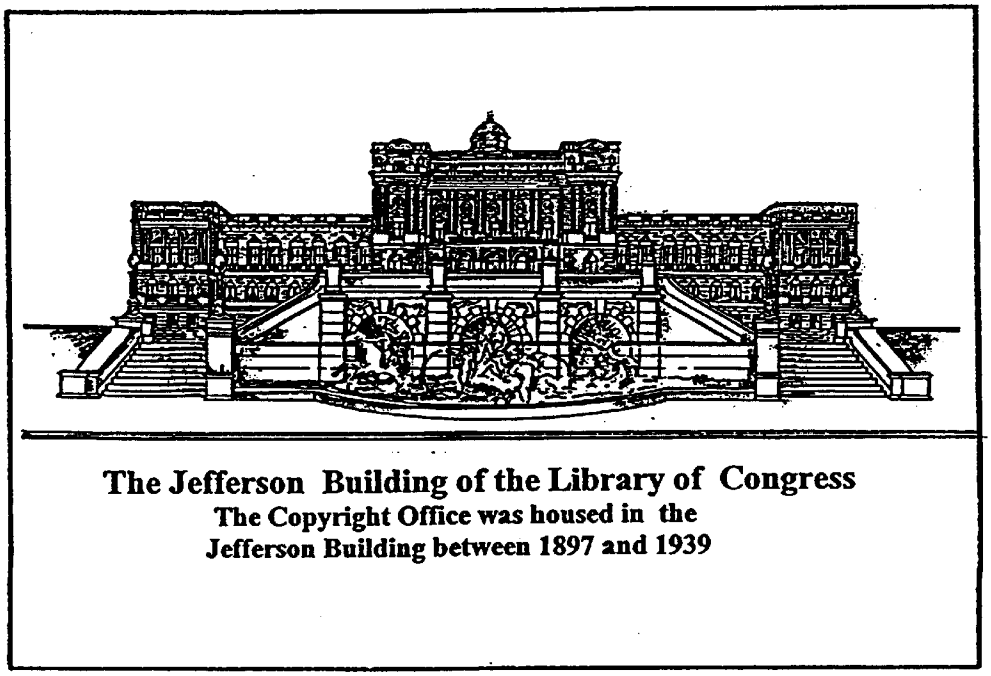
FIG. 3B is a plan view of a second workpiece after a second design has been printed thereon.

As those skilled in the art will recognize, the designs shown in FIGS. 3A and 3B differ substantially from each other. In particular, the design shown in FIG. 3A is printed in cartoon style and consists primarily of large stylized elements. Moreover, the design comprises only a small amount of text that is also printed in a relatively large and somewhat stylized font or typeface. Consequently, the amount of detail in the design of FIG. 3A is relatively small.

In contrast, the amount of detail in the design of FIG. 3B is substantially greater. This design comprises a highly realistic image and significant quantities of text printed using a small, more traditional font. As will be described below, subsequent processing steps on the workpiece may, in a preferred embodiment, be customized as a function of the particular design printed on it.

Figure 4:
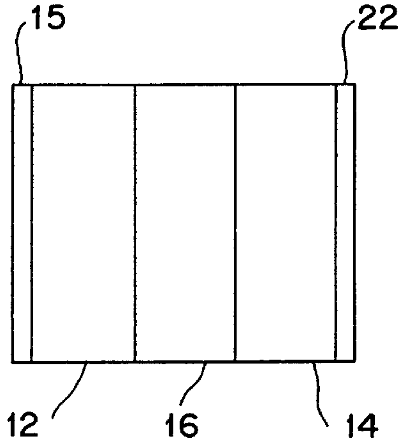
FIG. 4 is a schematic representation of a cross-sectional view of a preferred embodiment of the workpiece after a hit of black has been applied to the side of the workpiece opposite the side on which the design is printed.

Returning to FIG. 1, after the design is printed, step 110 is performed in which a hit of black is applied to the side of the workpiece opposite the side on which the design is printed. In a preferred embodiment this layer of black ink may be applied by offset lithography. The purpose of this black layer is to improve the see-through quality of the panel after it is perforated, as described below. FIG. 4 is a cross-sectional view of the workpiece after a hit of black ink 15 has been applied to the side of the workpiece opposite the side on which a design 22 has been printed.

The next step in the process is step 115 where a pressure-sensitive adhesive is applied to one side of the workpiece. As those skilled in the art will recognize, the particular adhesive chosen is preferably one that is suitable for the environment and conditions in which the panel will be displayed. Thus, for example, the adhesive chosen for a panel to be interior mounted on a glass door of a supermarket freezer may be different than that chosen for a panel to be mounted in the window of a desert gas station. In addition, as those skilled in the art recognize, the choice of adhesive may be a function of other conditions such as the average moisture content of the air in the location where the panel is to be displayed.

Figure 5A:
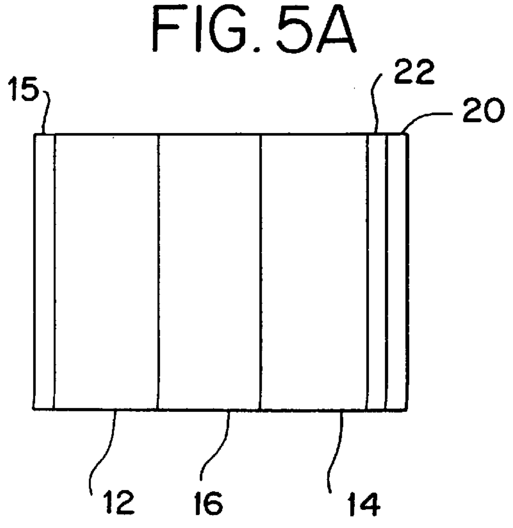
FIG. 5A is a schematic representation of a cross-sectional view of a workpiece intended for interior mounting after an adhesive layer has been applied thereto.
Figure 5B:
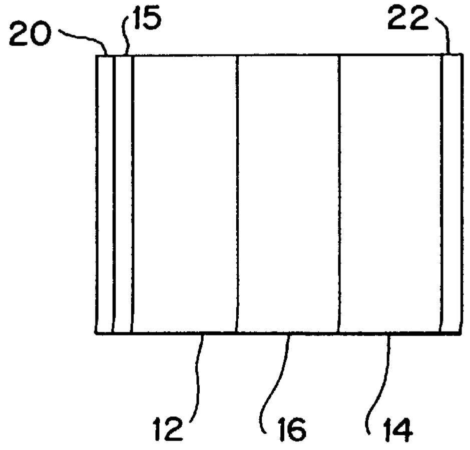
FIG. 5B is a schematic representation of a cross-sectional view of a workpiece intended for exterior mounting after an adhesive layer has been applied thereto.

FIGS. 5A–B represent cross-sectional views of the workpiece after an adhesive layer 20 has been applied to the polyethylene film. In the case of FIG. 5A, adhesive layer 20 has been applied to the design side of the workpiece, i.e., to the side of the workpiece on which design 22 is printed. In contrast, in the case of FIG. 5B, adhesive layer 20 has been applied to the black side of the workpiece, i.e., the side of the workpiece opposite the side on which the design is printed.

When the panel is to be mounted on an interior surface, such as the inside of a shop window, adhesive layer 20 is typically applied to the design side of the workpiece as shown in FIG. 5A. This allows the panel's printed design to be seen by persons passing by outside the shop window when the panel is mounted.

In contrast, if the panel is to be mounted on an exterior surface, such as the outside of a shop window, adhesive layer 20 is applied to the black side of the workpiece as shown in FIG. 5B. In this case, the black side of the workpiece adheres to the shop window, while the design side faces outward and displays the printed message to persons outside the shop.

Thus, one advantage of the present invention is that it is unnecessary to determine whether the panels will be exterior or interior mounted until after the panels have been printed. This permits panels to be more efficiently produced since panels intended for interior and exterior mounting may be simultaneously printed during a single printing run. In addition, it permits decisions regarding whether the panels are to be interior or exterior mounted to be delayed until after the panels have been printed.

Also, because the adhesive layer may be disposed on top of the printed design, the present invention permits interior-mount panels to be produced from highly-opaque bright-white polyethylene. This is a significant advantage because the sharpness and quality of a printed color image is largely a function of the brightness and opacity of the substrate on which the image is printed. As noted, interior mount panels of the prior art were typically made of clear plastic panels and required a hit of white on top of the design to set up the image. Panels produced in accordance with this prior art technique are not as opaque or bright as those of the present invention and therefore the printed design, and in particular the colors of the printed design, do not appear as sharp and vibrant as those of the present invention.

Figure 6A:
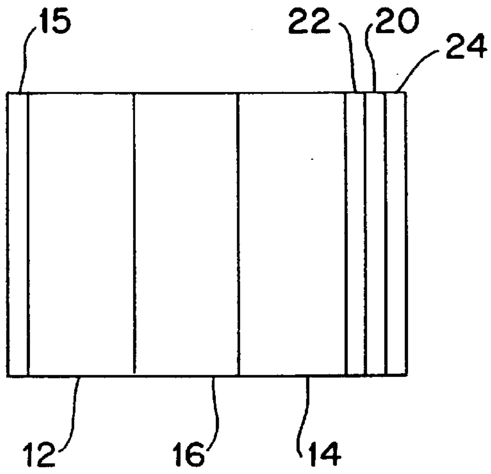
FIG. 6A is a schematic representation of a cross-sectional view of the workpiece intended for interior mounting after a release liner has been applied over the adhesive layer.
Figure 6B:
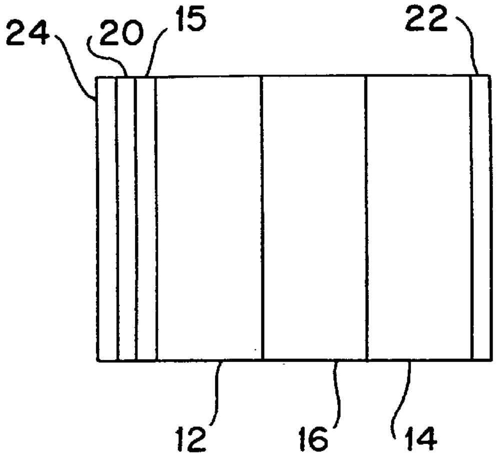
FIG. 6B is a schematic representation of a cross-sectional view of the workpiece intended for exterior mounting after a release liner has been applied over the adhesive layer.
Figure 7:
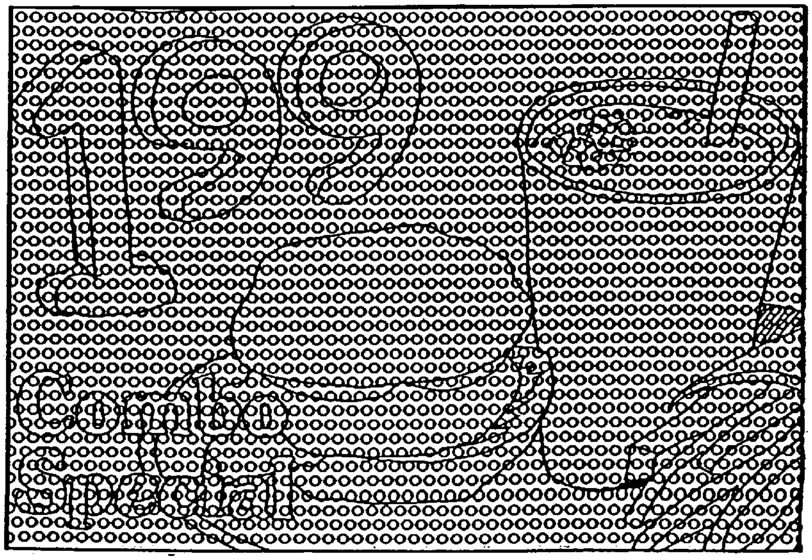
FIG. 7 is a plan view of the workpiece after it has been perforated.
Figure 8:
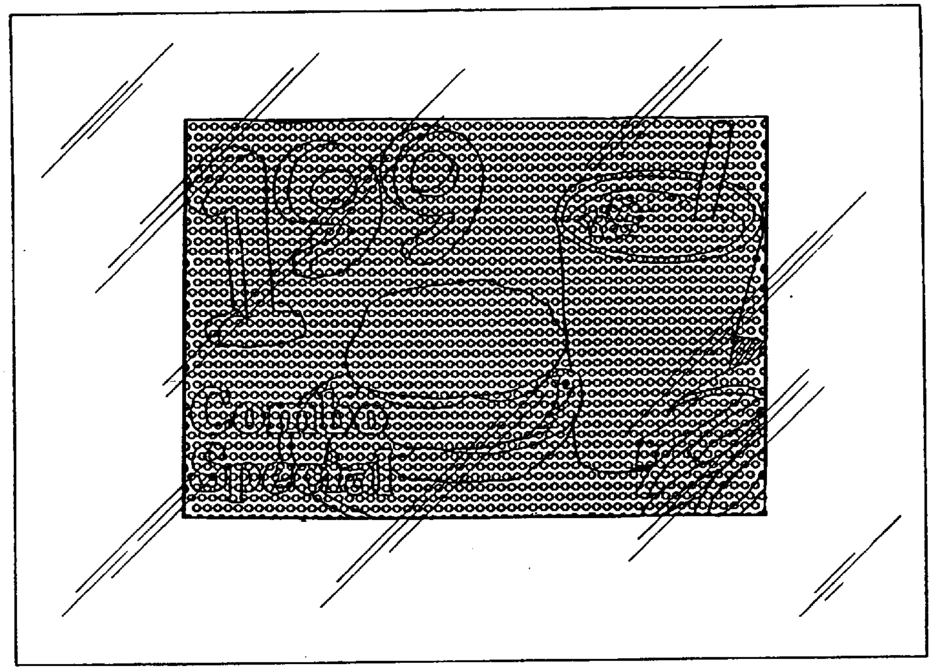
FIG. 8 shows a display panel of the present invention mounted on the interior of a store window.
Figure 9:
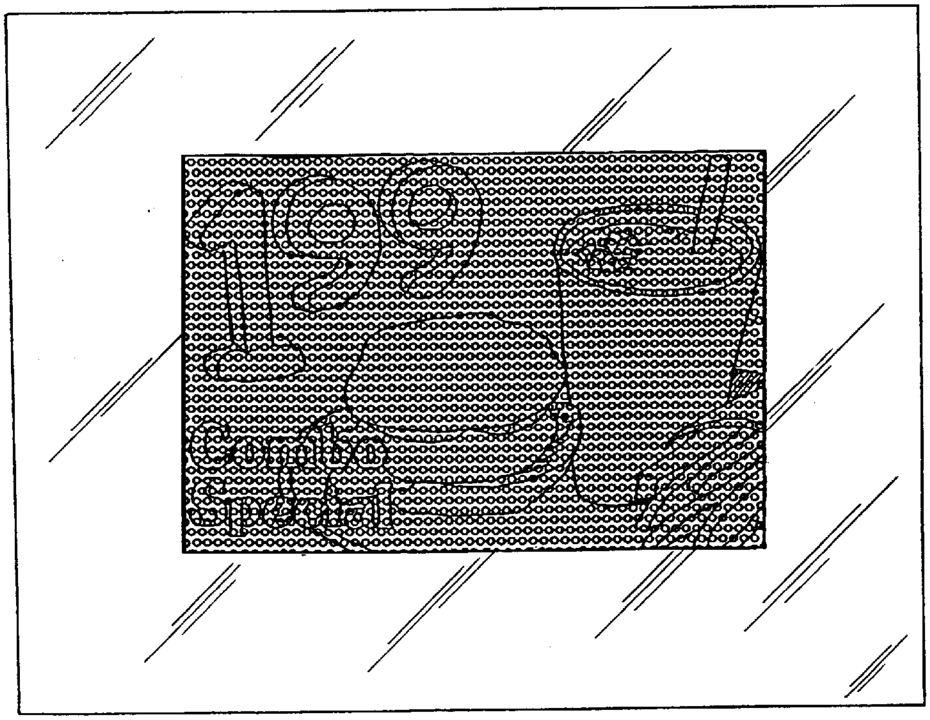
FIG. 9 shows a display panel of the present invention mounted on the exterior of a store window.

In step 120, adhesive layer 20 is covered by a release liner 24, as shown in FIGS. 6A–B. In a preferred embodiment, release liner 24 may comprise a polyester film with a thickness of at least 1.5 mm. The material and thickness of the release liner are important parameters because the release liner must be strong enough so as not to shred when it is pulled off the panel after the workpiece has been perforated, as described below.

In step 125, the workpiece is perforated. In a preferred embodiment, the size of the pins of the perforator may be adjusted to control the size of the perforations cut in the workpiece. Specifically, in one preferred embodiment, a pinsize of 0.078" may be employed. This pinsize yields perforations of 0.120" measured from center to center, and a total perforated area equal to 51% of the surface area of the workpiece.

In a second preferred embodiment, a pinsize of 0.068" may be employed. This pinsize yields perforations of 0.100" measured from center to center and a total perforated area equal to 36% of the surface area of the workpiece.

More generally, the range of suitable pinsizes is approximately 0.051" to 0.094", which yield perforations of 0.068" to 0.136" measured from center to center, respectively.

As noted above, in a preferred embodiment, the perforation size may be chosen as a function of the particular design printed on the display panel. As a general rule it is desirable to make the perforations as large as possible to the extent that doing so does not adversely affect the perceptibility and distinctiveness of the printed design from distances at which the design is intended to be viewed. This is because large perforations maximize the amount of light that is able to pass through the panel, and thus minimize the darkening effect caused by mounting the panel in, for example, a storefront window.

In particular, for designs comprising little detail (e.g., the design shown in FIG. 3A), the pinsize may preferably be approximately 0.078" without significantly affecting the perceptibility and distinctiveness of the printed design when the panel is viewed from its intended distance. A perforation of this size is near the top of the range specified above and is desirable because it maximizes the amount of light that passes through the panel without significantly affecting the perceptibility and distinctiveness of a printed design that does not have significant detail.

In contrast, for designs comprising significant detail (e.g., the design shown in FIG. 3B), the pinsize may preferably be approximately 0.068". Although this results in somewhat less light passing through the perforated panel, this smaller pinsize is necessary to maintain the detail inherent in the printed design.

In a preferred embodiment, both sides of the workpiece may be covered by transfer sheets during the perforation process. This prevents the adhesive layer from sticking to the perforating pins and detrimentally affecting the perforation process.

After processing steps 105–125 are completed, the resulting display panel may be mounted by removing release liner 24 and pressing the adhesive side of the panel to the mounting surface.

Thus, the present invention comprises an improved perforated display panel and an improved process for manufacturing such panels. In particular, the preferred perforated display panels of the present invention comprise a low-cost bright-white highly-opaque polyethylene banner material having a design printed thereon. The design is applied to the polyethylene material before additional and expensive finishing processes, such as perforation, are performed on the workpiece. Consequently, these finishing processes need not be performed on panels that are spoiled during printing, thus minimizing the production cost of the panel.

While the invention has been described in conjunction with specific embodiments, it is evident that numerous alternatives, modifications, and variations will be apparent to those skilled in the art in light of the foregoing description.

What is claimed is:

1. A method of making perforated display panels adapted for interior mounting comprising the steps of:

printing a design on a first side of a single sheet of reflective opaque material;

applying an adhesive layer to only the first side of the material on top of the design;

applying a release liner to cover the adhesive; and perforating in tandem the sheet of material, the adhesive, and the release liner.

2. The method of claim 1, wherein the single sheet of material is a polyethylene material.

3. The method of claim 2, wherein the polyethylene material comprises a grey layer.

4. The method of claim 1, further comprising the step of applying a hit of black to the side of the material opposite the design side of the material.

5. The method of claim 1, wherein the step of perforating creates perforations of approximately 0.068" to 0.136" in size.

6. The method of claim 4, wherein the perforator pinsize employed to make the perforations is approximately 0.051" to 0.094".

7. The method of claim 6, wherein the pinsize is approximately 0.078".

8. The method of claim 6, wherein the pinsize is approximately 0.068".

9. The method of claim 1, wherein the size of the perforation is chosen so as to maximize the amount of light passing through the panel without substantially degrading the appearance of the printed design.

* * * * *